(12) United States Patent
Yokoyama et al.

(10) Patent No.: US 12,107,451 B2
(45) Date of Patent: Oct. 1, 2024

(54) CHARGE CONTROL SYSTEM, CHARGE CONTROL DEVICE, AND RECORDING MEDIUM BASED ON BRIGHTNESS OF AN AREA

(71) Applicant: TOYOTA JIDOSHA KABUSHIKI KAISHA, Toyota (JP)

(72) Inventors: Daiki Yokoyama, Gotemba (JP); Daiki Kawachino, Shunto-gun (JP); Shota Tsukamoto, Shunto-gun (JP); Rie Yayabe, Shunto-gun (JP); Masaaki Sato, Shunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 496 days.

(21) Appl. No.: 17/501,228

(22) Filed: Oct. 14, 2021

(65) Prior Publication Data

US 2022/0140638 A1 May 5, 2022

(30) Foreign Application Priority Data

Nov. 2, 2020 (JP) ................. 2020-183936

(51) Int. Cl.
*H01M 10/46* (2006.01)
*G01J 1/42* (2006.01)
*G05B 15/02* (2006.01)
*H02J 7/00* (2006.01)

(52) U.S. Cl.
CPC ........... *H02J 7/007188* (2020.01); *G01J 1/42* (2013.01); *G05B 15/02* (2013.01); *G01J 2001/4266* (2013.01)

(58) Field of Classification Search
CPC ...... H02J 7/0042; H02J 7/007188; G01J 1/42; G01J 1/4204; G01J 1/4228; G01J 2001/4266; G05B 15/02
USPC ........ 320/101, 104, 109, 112, 115, 116, 132, 320/149
See application file for complete search history.

(56) References Cited

U.S. PATENT DOCUMENTS

| | | |
|---|---|---|
| 2015/0310461 A1 | 10/2015 | Lee et al. |
| 2018/0229653 A1* | 8/2018 | Oh .................... B60K 35/00 |
| 2020/0122603 A1 | 4/2020 | Kubo et al. |

FOREIGN PATENT DOCUMENTS

| | | | | |
|---|---|---|---|---|
| DE | 10140415 A1 * | 2/2003 | ............... | G01J 1/42 |
| JP | 10-285825 A | 10/1998 | | |
| JP | 2001-258177 A | 9/2001 | | |
| JP | 2017-516247 A | 6/2017 | | |
| JP | 2020-64031 A | 4/2020 | | |

* cited by examiner

*Primary Examiner* — Edward Tso
(74) *Attorney, Agent, or Firm* — Oblon, McClelland, Maier & Neustadt, L.L.P.

(57) ABSTRACT

A charge control system includes: a charging device having a first processor configured to store electric power to be supplied to a preset area; and a charge control device having a second processor configured to acquire brightness information in the area, calculate a charge amount of the charging device on a basis of the acquired brightness information, and perform charge control of the charging device on a basis of the calculated charge amount. Further, when calculating the charge amount, the second processor calculates the charge amount in such a manner that the charge amount decreases as brightness in the area increases.

12 Claims, 2 Drawing Sheets

CHARGE CONTROL SYSTEM, CHARGE CONTROL DEVICE, AND RECORDING MEDIUM BASED ON BRIGHTNESS OF AN AREA

CROSS-REFERENCE TO RELATED APPLICATION(S)

The present application claims priority to and incorporates by reference the entire contents of Japanese Patent Application No. 2020-183936 filed in Japan on Nov. 2, 2020.

BACKGROUND

The present disclosure relates to a charge control system, a charge control device, and a recording medium.

In a smart city or the like, a technique for obtaining an optimum electricity rate on the basis of weather data or the like is known (see, for example, Japanese Unexamined Patent Application Publication No. 2017-516247).

SUMMARY

There is a need for providing a charge control system, a charge control device, and a recording medium storing a charge control program capable of efficiently using electric power stored in a charging device when performing city operation of a smart city or the like.

According to an embodiment, a charge control system includes: a charging device having a first processor configured to store electric power to be supplied to a preset area; and a charge control device having a second processor configured to acquire brightness information in the area, calculate a charge amount of the charging device on a basis of the acquired brightness information, and perform charge control of the charging device on a basis of the calculated charge amount. Further, when calculating the charge amount, the second processor calculates the charge amount in such a manner that the charge amount decreases as brightness in the area increases.

According to an embodiment, a charge control device includes a processor to: acquire brightness information in a preset area; calculate a charge amount of a charging device that stores electric power to be supplied to the area on a basis of the acquired brightness information; and perform charge control on the charging device on a basis of the calculated charge amount. Further, when calculating the charge amount, the processor calculates the charge amount in such a manner that the charge amount decreases as brightness in the area increases.

According to an embodiment, a non-transitory computer-readable recording medium storing a charge control program causing a processor to: acquire brightness information in a preset area; calculate a charge amount of a charging device that stores electric power to be supplied to the area on a basis of the acquired brightness information; perform charge control of the charging device on a basis of the calculated charge amount; and calculate, when calculating the charge amount, the charge amount in such a manner that the charge amount decreases as brightness in the area increases.

DETAILED DESCRIPTION

In the related art, there has been a demand for a technique capable of efficiently using electric power stored in a charging device when performing city operation of a smart city or the like using the electric power stored in the charging device.

A charge control system, a charge control device, and a charge control program according to an embodiment of the present disclosure will be described with reference to the drawings. Note that components in the following embodiment include those that can be replaced by a person skilled in the art and that are easy, or those that are substantially the same.

Charge Control System

A charge control system including a charge control device according to the embodiment will be described with reference to FIG. 1. The charge control system is for performing charge control of a charging device that supplies electric power to a preset area. The "preset area" is an area where a large number of users live or use, and examples thereof include a smart city, a theme park, a leisure land, and the like. In the present embodiment, a description will be given assuming that this area is a smart city.

Figure 1:
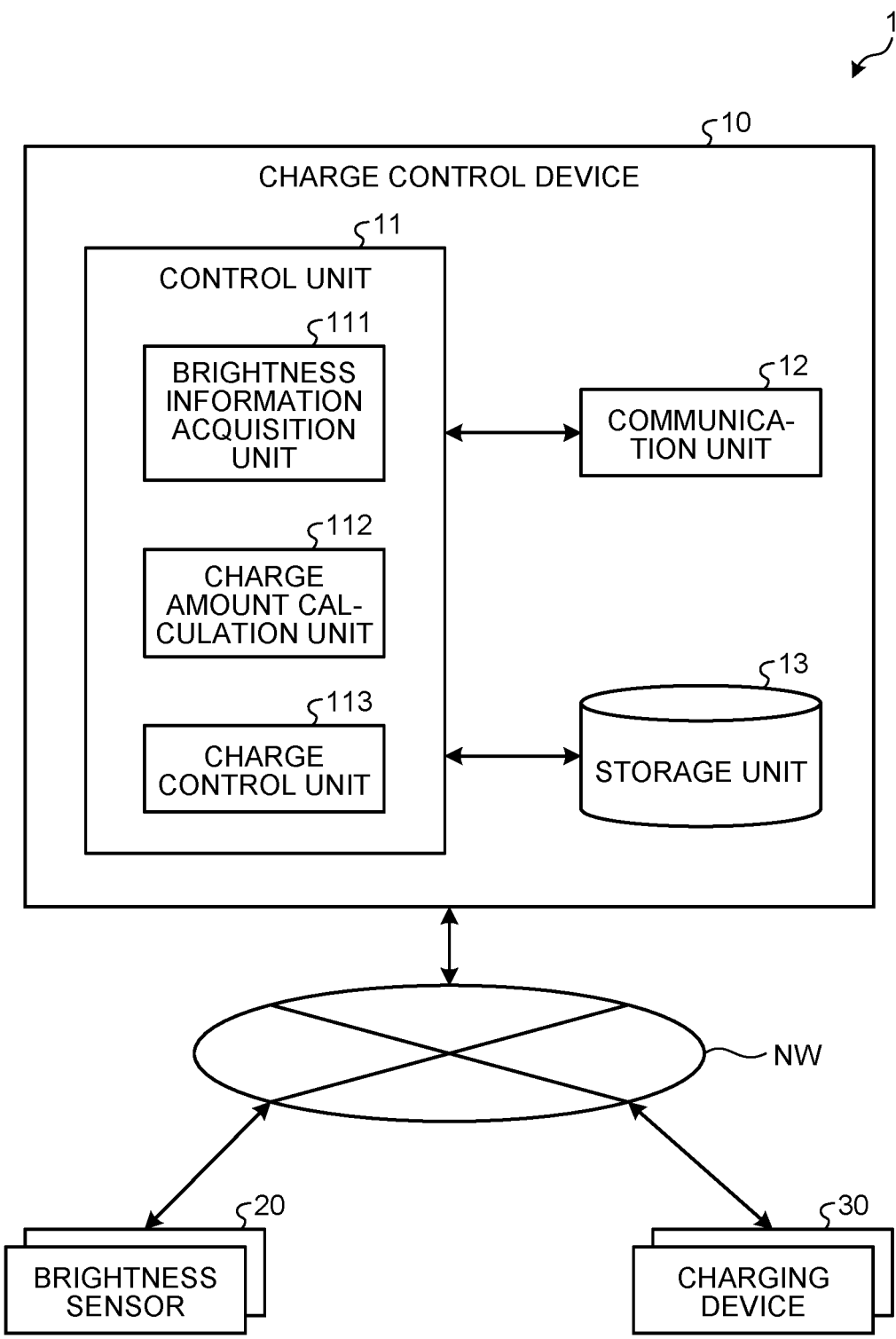
FIG. 1 is a block diagram illustrating an detail of components in a charge control system according to an embodiment.

As illustrated in FIG. 1, a charge control system 1 has a charge control device 10, a plurality of brightness sensors 20, and a plurality of charging devices 30. The charge control device 10, the brightness sensors 20, and the charging device 30 all have a communication function, and are configured to be capable of communicating with each other through the network NW. The network NW includes, for example, an Internet line network, a mobile phone line network, and the like.

Charge Control Device

The charge control device 10 is provided inside the smart city or outside the smart city. The charge control device 10 is achieved by, for example, a general-purpose computer such as a workstation or a personal computer.

As illustrated in FIG. 1, the charge control device 10 includes a control unit 11, a communication unit 12, and a storage unit 13. Specifically, the control unit 11 includes a processor including a central processing unit (CPU), a digital signal processor (DSP), a field-programmable gate array (FPGA), and the like, and a memory (main storage unit) including a random access memory (RAM), a read only memory (ROM), and the like.

The control unit 11 loads a program stored in the storage unit 13 into a work area of the main storage unit and executes the program, and controls each component and the like through execution of the program, thereby achieving a function matching a predetermined purpose. The control unit 11 functions as a brightness information acquisition unit 111, a charge amount calculation unit 112, and a charge control unit 113 through execution of the program stored in the storage unit 13.

The brightness information acquisition unit 111 acquires brightness information in a preset area (hereinafter referred to as "smart city"). This brightness information is, for example, information regarding the brightness of an open place in the smart city, that is, an outside (outdoor) of a building.

The brightness information acquisition unit 111 acquires brightness information from the plurality of brightness sensors 20 installed in the smart city, for example. In this case, as the brightness information, an average value, a maximum value, or a minimum value of the current brightness in the smart city acquired from the plurality of brightness sensors 20 can be used. Further, the brightness information acquisition unit 111 acquires the brightness information sequentially or at a predetermined cycle (for example, every hour or the like) from the plurality of brightness sensors 20.

Further, instead of acquiring the brightness information via the brightness sensors 20, or by acquiring the brightness information via the brightness sensors 20 and estimating the brightness in the smart city, the brightness information acquisition unit 111 may generate the brightness information. In this case, the brightness information acquisition unit 111 can collect weather information from, for example, a server (weather server) or the like provided in the Meteorological Agency or the like, and estimate the current or future brightness in the smart city on the basis of the weather information.

The charge amount calculation unit 112 calculates the charge amount of the charging device 30 on the basis of the brightness information acquired or estimated by the brightness information acquisition unit 111. More specifically, the charge amount calculation unit 112 acquires information (hereinafter referred to as "charge information") regarding a current state (for example, a charge amount or a discharge amount) of the charging device 30 from the charging device 30, and calculates the charge amount of the charging device 30 on the basis of the brightness information and the charge information. Then, when calculating the charge amount, the charge amount calculation unit 112 calculates the charge amount so that the charge amount decreases as the brightness in the smart city increases. Thus, the charge amount of the charging device 30 can be appropriately determined.

Note that a specific method of calculating the charge amount by the charge amount calculation unit 112 is not particularly limited, and for example, various methods can be used, such as a method of adding a power correction amount set according to brightness to a power amount per unit time necessary for the operation of the smart city, and a method using a learning model or the like in which the relationship between brightness in the smart city and the charge amount is learned.

Further, the charge amount calculation unit 112 may calculate the charge amount on the basis of, for example, the brightness information acquired or estimated by the brightness information acquisition unit 111 and information regarding a moon phase. For example, on a full moon day, the outside is bright and the illuminance of electric lights at night can be lowered, and thus it is not necessary to store the electric power by that amount in the charging device 30.

Therefore, the charge amount of the charging device 30 can be more appropriately determined by considering the moon phase in addition to the brightness information. Note that the information regarding the moon phase can be acquired from, for example, a server (hereinafter referred to as a "weather server") or the like provided in the Meteorological Agency or the like. Further, the charge amount calculation unit 112 may calculate the charge amount using only the information regarding the moon phase without using the brightness information.

Further, the charge amount calculation unit 112 may calculate the charge amount on the basis of, for example, brightness information acquired or estimated by the brightness information acquisition unit 111, and a sunshine amount and a sunshine duration of the smart city. For example, in a case where the sunshine amount of the smart city is high and the sunshine duration is long, the lighting time of electric lights can be shortened, and thus it is not necessary to store the electric power by that amount in the charging device 30.

Therefore, the charge amount of the charging device 30 can be more appropriately determined by considering the sunshine amount and the sunshine duration of the smart city in addition to the brightness information. Note that the information regarding the sunshine amount and the sunshine duration of the smart city can be acquired from, for example, the weather server or the like. Further, the charge amount calculation unit 112 may calculate the charge amount by using only information regarding the moon phase without using the sunshine amount and the sunshine duration of the smart city.

The charge control unit 113 performs charge control of the charging device 30 on the basis of the charge amount calculated by the charge amount calculation unit 112. A specific method of the charge control by the charge control unit 113 is not particularly limited, and for example, the charge amount calculation unit 112 may perform the charge control by transmitting a command to increase or decrease the current or future charge amount to the charging device 30 on the basis of the charge amount calculated at a predetermined cycle.

The communication unit 12 includes, for example, a local area network (LAN) interface board, a wireless communication circuit for wireless communication, and the like. The communication unit 12 is connected to a network NW such as the Internet which is a public communication network. Then, the communication unit 12 communicates with the brightness sensors 20 and the charging device 30 by being connected to the network NW.

The storage unit 13 includes a recording medium such as an erasable programmable ROM (EPROM), a hard disk drive (HDD), and a removable medium. Examples of the removable medium include disk recording media such as a universal serial bus (USB) memory, a compact disc (CD), a digital versatile disc (DVD), or a Blu-ray (registered trademark) disc (BD). The storage unit 13 can store an operating system (OS), various programs, various tables, various databases, and the like. Further, in the storage unit 13, for example, the brightness information acquired by the brightness information acquisition unit 111, the charge amount of the charging device 30 calculated by the charge amount calculation unit 112, and the like are stored as necessary.

Brightness Sensor

The brightness sensors 20 are for acquiring brightness information in the smart city, and the plurality of brightness sensors is installed at predetermined locations in the smart city. Then, the brightness sensors 20 transmit the acquired brightness information to the charge control device 10 sequentially or at a predetermined cycle.

Charging Device

The charging device 30 is for storing electric power to be supplied to the smart city, and is provided inside or outside the smart city. This charging device 30 is achieved by, for example, a general-purpose computer such as a workstation or a personal computer. Further, the charging device 30 incorporates a battery for storing electric power, a control mechanism for controlling charging and discharging of electric power, and the like. In addition, the charging device 30 transmits current charge information regarding the charging device 30 to the charge control device 10 sequentially or at a predetermined cycle.

Charge Control Method

Figure 2:
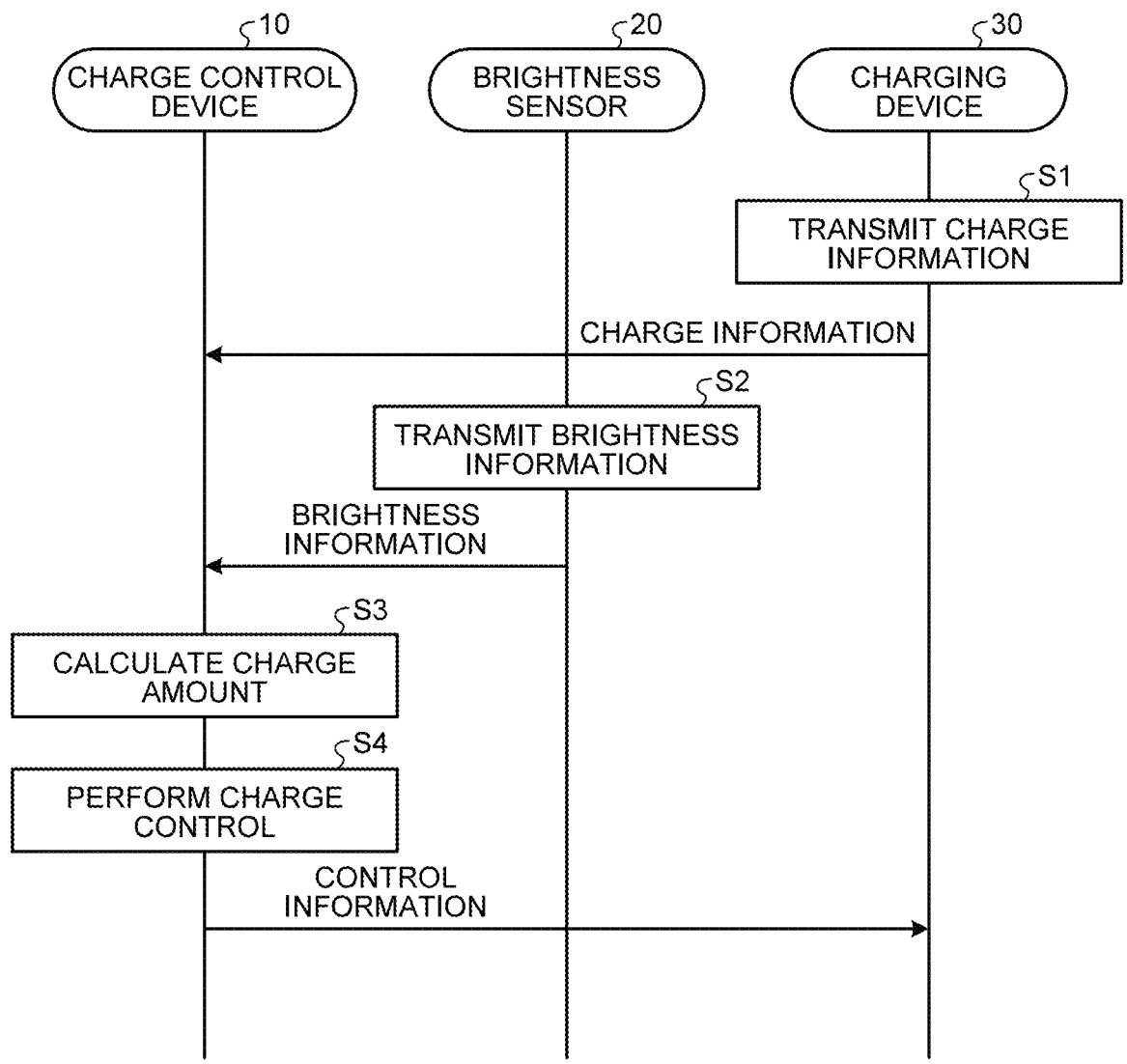
FIG. 2 is a flowchart illustrating an example of a charge control method executed by the charge control system according to the embodiment.

An example of a processing procedure of the charge control method executed by the charge control system 1 according to the embodiment will be described with reference to FIG. 2.

First, the charging device 30 transmits the charge information to the charge control device 10 (step S1). Subsequently, the brightness sensor 20 transmits the brightness information to the charge control device 10 (step S2). Note that the order of steps S1 and S2 may be reversed.

Subsequently, the charge amount calculation unit 112 of the charge control device 10 calculates the charge amount of the charging device 30 on the basis of the brightness information and the charge information (step S3). Subsequently, the charge control unit 113 performs charge control of the charging device 30 on the basis of the calculated charge amount (step S4). Thus, the processing of the charge control method is completed.

As described above, with the charge control system, the charge control device, and the charge control program according to the embodiment, the electric power stored in the charging device 30 can be efficiently used when performing city operation of a smart city or the like using the electric power stored in the charging device 30.

For example, in a case where the inside of the smart city is bright, electric power consumption decreases, and thus if more electric power than consumed is stored in the charging device 30, the electric power is wasted. Further, if extra electric power is stored in the charging device 30 or a fully charged state continues for a long period of time, the battery built in the charging device 30 may deteriorate.

On the other hand, in the charge control system, the charge control device, and the charge control program according to the embodiment, in a case where the inside of the smart city is bright (in a case where the inside of the smart city is expected to be bright), the charge amount to the charging device 30 can be reduced as compared with a case where the inside of the smart city is dark, and thus it is possible to suppress waste of electric power and deterioration of the battery.

According to the present disclosure, electric power stored in a charging device can be efficiently used when performing city operation or a smart city or the like.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A charge control system comprising:
   a charging device having a first processor configured to store electric power to be supplied to an area; and
   a charge control device having a second processor configured to acquire brightness information in the area, calculate a charge amount of the charging device on a basis of the acquired brightness information, and perform charge control of the charging device on a basis of the calculated charge amount,
   wherein when calculating the charge amount, the second processor decreases the charge amount as brightness in the area increases.

2. The charge control system according to claim 1, wherein the second processor calculates the charge amount on a basis of the brightness information and information regarding a moon phase.

3. The charge control system according to claim 1, wherein the second processor calculates the charge amount on a basis of the brightness information, and a sunshine amount and a sunshine duration of the area.

4. The charge control system according to claim 1, wherein the brightness information is an average value, a maximum value, or a minimum value of brightness acquired from a plurality of brightness sensors installed in the area.

5. A charge control device comprising a processor configured to:
   acquire brightness information in an area;
   calculate a charge amount of a charging device that stores electric power to be supplied to the area on a basis of the acquired brightness information; and
   perform charge control on the charging device on a basis of the calculated charge amount,
   wherein when calculating the charge amount, the processor decreases the charge amount as brightness in the area increases.

6. The charge control device according to claim 5, wherein the processor calculates the charge amount on a basis of the brightness information and information regarding a moon phase.

7. The charge control device according to claim 5, wherein the processor calculates the charge amount on a basis of the brightness information, and a sunshine amount and a sunshine duration of the area.

8. The charge control device according to claim 5, wherein the brightness information is an average value, a maximum value, or a minimum value of brightness acquired from a plurality of brightness sensors installed in the area.

9. A non-transitory computer-readable recording medium storing a charge control program causing a processor to:
   acquire brightness information in an area;
   calculate a charge amount of a charging device that stores electric power to be supplied to the area on a basis of the acquired brightness information;
   perform charge control of the charging device on a basis of the calculated charge amount; and
   when calculating the charge amount, decrease the charge amount as brightness in the area increases.

10. The non-transitory computer-readable recording medium storing the charge control program according to claim 9, further causing the processor to
   calculate the charge amount on a basis of the brightness information and information regarding a moon phase.

11. The non-transitory computer-readable recording medium storing the charge control program according to claim 9, further causing the processor to
   calculate the charge amount on a basis of the brightness information, and a sunshine amount and a sunshine duration of the area.

12. The non-transitory computer-readable recording medium storing the charge control program according to claim 9, wherein the brightness information is an average value, a maximum value, or a minimum value of brightness acquired from a plurality of brightness sensors installed in the area.

* * * * *